March 17, 1931.    J. MODLER    1,796,610

ROLLER BEARING

Filed Nov. 25, 1927

Inventor:
J. Modler
by Hans Heidrich
P.V.
Attorney

Patented Mar. 17, 1931

1,796,610

UNITED STATES PATENT OFFICE

JOHANN MODLER, OF ASCHAFFENBURG, GERMANY

ROLLER BEARING

Application filed November 25, 1927, Serial No. 235,581, and in Germany December 1, 1926.

The first purpose of the invention is to make the adjustment of the roll-bearings independent of the ability of the adjusting workman.

The invention is however no device for automatic adjustment of such roll-bearings.

The invention is illustrated diagrammatically and by way of example on the accompanying drawing, on which Fig. 1 shows the roll-bearing before being adjusted.

Figures 4, 5, 6:
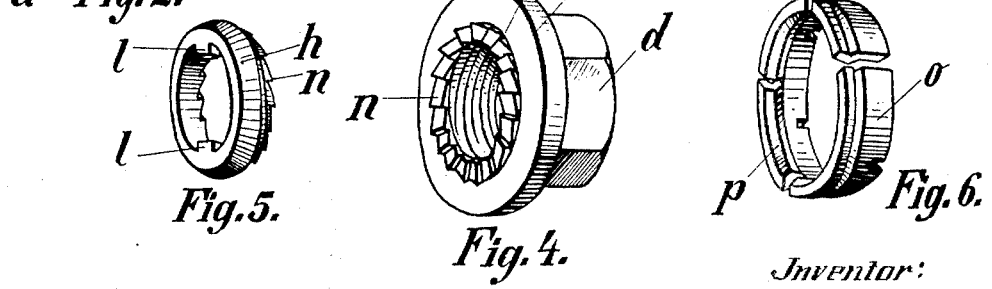
Figures 4 to 6 show the improvement with the details.

The axis $a$ of the bearing is surrounded by the hub $b$. On the axis $a$ the rollers $c$ are arranged in such manner, that the hub $b$ is supported by the axis $a$ by means of their rollers $c$. In order to adjust the conical surfaces of the conical roller bearing there is provided the thread $k$ on the end of the axis $a$ and the screw nut $d$. In the care of pressing the screw nut $d$ on the thread $k$ without any intermediate means on the conical surfaces of the roll-bearing $a$, $b$, $c$, the pressure may be too great or too little. There is no change if a spring for instance for automatic adjustment is inserted between the parts of the bearing $a$, $b$, $c$ and the screw nut $d$. In order to have the adjustment of the pressure in the bearing $a$, $b$, $c$, independent of the ability of the adjusting workman a coupling is inserted between the screw nut $d$ and the bearing $a$, $b$, $c$. By screwing in the screw nut $d$ finishes the movement of adjustment automatically, as soon as a determined pressure is attained. The coupling consists of the two halfs of coupling $h$ and $i$; the the part $i$ is joined with the screw nut in one piece, as it is shown in Figure 4. The coupling half $h$ has a transverse section of the form of a lens and is provided with wedge shaped projections $l$ (Fig. 5). These projections engage with grooves $m$ of the axis $a$. In this way the coupling part $h$ is freely axially shiftable on the axis $a$. As well the coupling part $h$ as the coupling part $i$, which is joined with the screw nut, have saw-shaped teeth $n$, which are formed in such a manner, that—as shown in Figures 4 and 5—the screw-nut $d$ cannot be turned on the thread $k$ of the axis $a$, if the coupling $h$ engages with its teeth $n$ in the teeth $n$ of the coupling $i$ respectively of the screw nut $d$.

In order to execute this blockade of the screw nut on the axis $a$ the ringshaped spring $o$ is provided, which is shown in Figure 6. The spring $o$ is a cylinder burst open and therfore being able to be bent up to a greater diameter with proportionally little pressure. This spring is provided with an inward ring bunch $p$ of triangular cross-section, the angle of which essentially agrees with the angle of the coupling part $h$. This ring $o$ lays against a projection $q$ of the screw nut $d$.

Figures 2, 3:
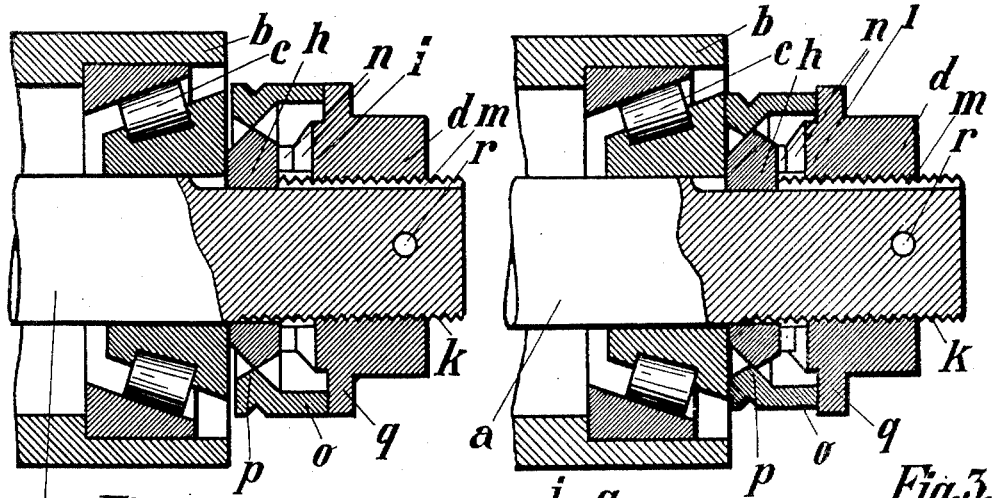
Fig. 2 shows the roll-bearing during the adjustment.
Fig. 3 shows the roll-bearing after the adjustment.

If by means of the screw nut $d$ the spring $o$ is shifted axially this spring arises gradually on the outer diameter of the coupling part $h$. As soon as it has attained the highest point, it tips over—see Figure 3—and moves the coupling part $h$ axially inwards in such a manner that the teeth $n$ of the coupling part $h$ engage the teeth $n$ of the coupling part $i$, which is joined to the screw nut. Now the screw nut cannot be turned further and the proportions may be chosen without difficulty in such manner, that now the bearing $a$, $b$, $c$ is in an exactly determined state of pressure.

Figure 1:
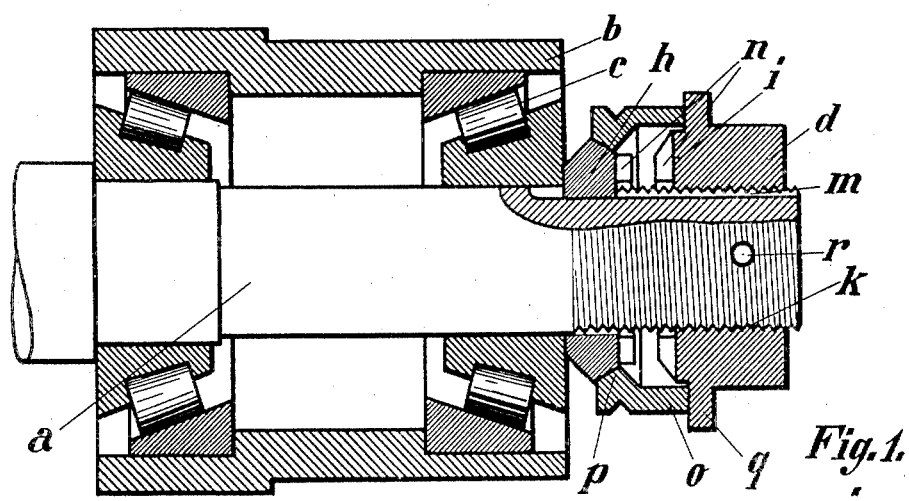

If the parts of the bearing $a$, $b$, $c$ are worn out and shall again need adjustment, the nut $d$ may be screwed off because this movement is in opposite direction. The parts, which are in the position of Figure 3, may now be carried back to the position of Fig. 1.

In consequence of the form of the teeth $n$ there is no impediment to screw back the nut $d$, in order to stick a splint through the hole $r$.

Having now particularly described my said invention I declare that what I claim is:

1. An adjusting device for roller bearings, comprising, in combination with an axle trunnion supporting the respective roller bearing and projecting beyond the outer race ring thereof and having a thread on this projecting end; an annular member located upon this end and contacting with said race ring and having a circumferential surface which is wedge-shaped in axial section; a transversely split ring having at one end an inner collar, the inner circumferential surface of which is also wedge-shaped in axial section and which contacts with the wedge-shaped circumferential surface of said annular member; and a nut screwed upon the free portion of said threaded trunnion and having a portion of its circumference formed as a collar contacting with the other end of said split ring, said nut being adapted to force the said ring onto and over the said annular member, substantially as set forth.

2. An adjusting device for roller bearings, comprising, in combination with an axle trunnion supporting the respective roller bearing and projecting beyond the outer race ring thereof and having a thread on this projecting end and a longitudinal groove therein; an annular member located upon this end and having an inner projection engaging said groove and contacting with said race ring and having a circumferential surface which is wedge-shaped in axial section; a transversely split ring having at one end an inner collar, the inner circumferential surface of which is also wedge-shaped in axial section and which contacts with the wedge-shaped circumferential surface of said annular member; and a nut screwed upon the free portion of said threaded trunnion and having a portion of its circumference formed as a collar contacting with the other end of said split ring, said nut being adapted to force the said ring onto and over the said annular member, substantially as set forth.

3. An adjusting device for roller bearings, comprising, in combination with an axle trunnion supporting the respective roller bearing and projecting beyond the outer race ring thereof and having a thread on this projecting end; an annular member located upon this end and contacting with said race ring and having a circumferential surface which is wedge-shaped in axial section; a transversely split ring having at one end an inner collar, the inner circumferential surface of which is also wedge-shaped in axial section and which contacts with the wedge-shaped circumferential surface of said annular member; a nut screwed upon the free portion of said threaded trunnion and having a portion of its circumference formed as a collar contacting with the other end of said split ring, said nut being adapted to force the said ring onto the said annular member; and two oppositely located crowns of ratchet teeth, of which one set is provided at the said nut and the other at the said annular member, the arrangement of said sets relatively to one another being such that the teeth of the annular member prevent further rotation of the nut towards it when they are encountered by the teeth of the nut.

In testimony whereof, I affix my signature.

JOHANN MODLER.